(12) United States Patent
Braathen (10) Patent No.: US 12,173,932 B2
(45) Date of Patent: Dec. 24, 2024

(54) VALVE

(71) Applicant: Thor Frölich Braathen, Eggedal (NO)

(72) Inventor: Thor Frölich Braathen, Eggedal (NO)

( * ) Notice: Subject to any disclaimer, the term of this patent is extended or adjusted under 35 U.S.C. 154(b) by 0 days.

(21) Appl. No.: 17/772,979

(22) PCT Filed: Nov. 9, 2020

(86) PCT No.: PCT/EP2020/081495
§ 371 (c)(1),
(2) Date: Apr. 28, 2022

(87) PCT Pub. No.: WO2021/094258
PCT Pub. Date: May 20, 2021

(65) Prior Publication Data
US 2024/0151435 A1 May 9, 2024

(30) Foreign Application Priority Data

Nov. 14, 2019 (NO) .................................. 20191353

(51) Int. Cl.
*F24H 9/13* (2022.01)
*F24H 9/20* (2022.01)
*F24H 3/04* (2022.01)

(52) U.S. Cl.
CPC ........... *F24H 9/136* (2022.01); *F24H 9/2007* (2013.01); *F24H 3/0411* (2013.01); *F24H 9/133* (2022.01);
(Continued)

(58) Field of Classification Search
CPC ...... F24H 9/136; F24H 9/2007; F24H 9/2021; F24H 3/0411; F24H 9/133; F24H 9/2078; Y02B 10/20; Y02B 10/70
(Continued)

(56) References Cited

U.S. PATENT DOCUMENTS

| 4,403,602 A * | 9/1983 | Warden ................. F24D 11/003 126/610 |
| 2010/0089339 A1* | 4/2010 | Krause ................. F24D 17/0078 700/275 |

(Continued)

FOREIGN PATENT DOCUMENTS

| EP | 1637817 A1 | 3/2006 |
| EP | 2317233 A1 | 5/2011 |

(Continued)

OTHER PUBLICATIONS

Hoffmann, Stéphanie, International Search Report; PCT/EP2020/081495; dated Feb. 1, 2021; 3 pages.

*Primary Examiner* — Steven B McAllister
*Assistant Examiner* — Benjamin W Johnson
(74) *Attorney, Agent, or Firm* — Bradley Arant Boult Cummings LLP (57) ABSTRACT

The invention relates to a valve (16) for installation on a water heater comprising a tank (19) with one single welded socket (17), and where cold-water by discharge is led into a connection for a supply pipe (1), through a check valve (4) and down through a cold-water pipe (5a) to the bottom of the tank (19). The hot water in the top of the tank (19) is forced out through a cavity (7) and out of the valve through a connection for a hot water delivery pipe (9). The valve (16) has a connection for a suction pipe (10) for connection to a circulation pump (24) sucking cold water from the bottom of the tank (19) to external heating, wherein the circulation pump (24) leads the consumption water of the tank (19) back to the valve (16) through a connection for a return pipe (11) and to the middle of the tank (19). The return pipe (11) is arranged to be used for return from the circulation pipe between the tank (19) and a hot water cabinet (28).

7 Claims, 10 Drawing Sheets

(52) U.S. Cl.
CPC .......... *F24H 9/2021* (2013.01); *F24H 9/2078* (2013.01); *Y02B 10/20* (2013.01); *Y02B 10/70* (2013.01)

(58) Field of Classification Search
USPC ........................................................ 122/234
See application file for complete search history.

(56) References Cited

U.S. PATENT DOCUMENTS

| | | | |
|---|---|---|---|
| 2011/0203298 A1* | 8/2011 | Kim ...................... | F24H 15/281 62/204 |
| 2013/0327410 A1* | 12/2013 | Acker ................. | F24D 19/1051 137/563 |
| 2019/0170371 A1* | 6/2019 | Johnson .............. | F24D 19/1051 |
| 2019/0219276 A1* | 7/2019 | Acker .................... | E03B 7/045 |

FOREIGN PATENT DOCUMENTS

| | | |
|---|---|---|
| EP | 3147574 A1 | 3/2017 |
| FR | 2812717 A1 | 2/2002 |
| GB | 2460352 A | 12/2009 |
| NO | 303300 B1 | 6/1998 |
| WO | WO-9418509 A1 | 8/1994 |
| WO | WO-2005078359 A1 | 8/2005 |
| WO | WO-2009063308 A2 | 5/2009 |

\* cited by examiner

VALVE

TECHNICAL FIELD

The present invention relates to a complete valve for a water heater with all necessary functions in accordance with EN 1489, WRAS and US-regulations. In addition, the valve shall have connectors on the valve for supply and return from one or more external heat sources, for example solar panels, wood, gas or oil burner, or heat pump for heating a water heater. Likewise, the valve has connector for cold water (KV)-piping/hot water (VV)-piping and return pipes.

Preferably, use is made of a standard water heater and only one single water system, namely cold consumption water. Likewise, it should preferably be connected to only one circulation tube with temperature control and pump for immediate high temperature of the hot water by tapping to save energy and water, without risk of scalding.

BACKGROUND ART

Figure 1:
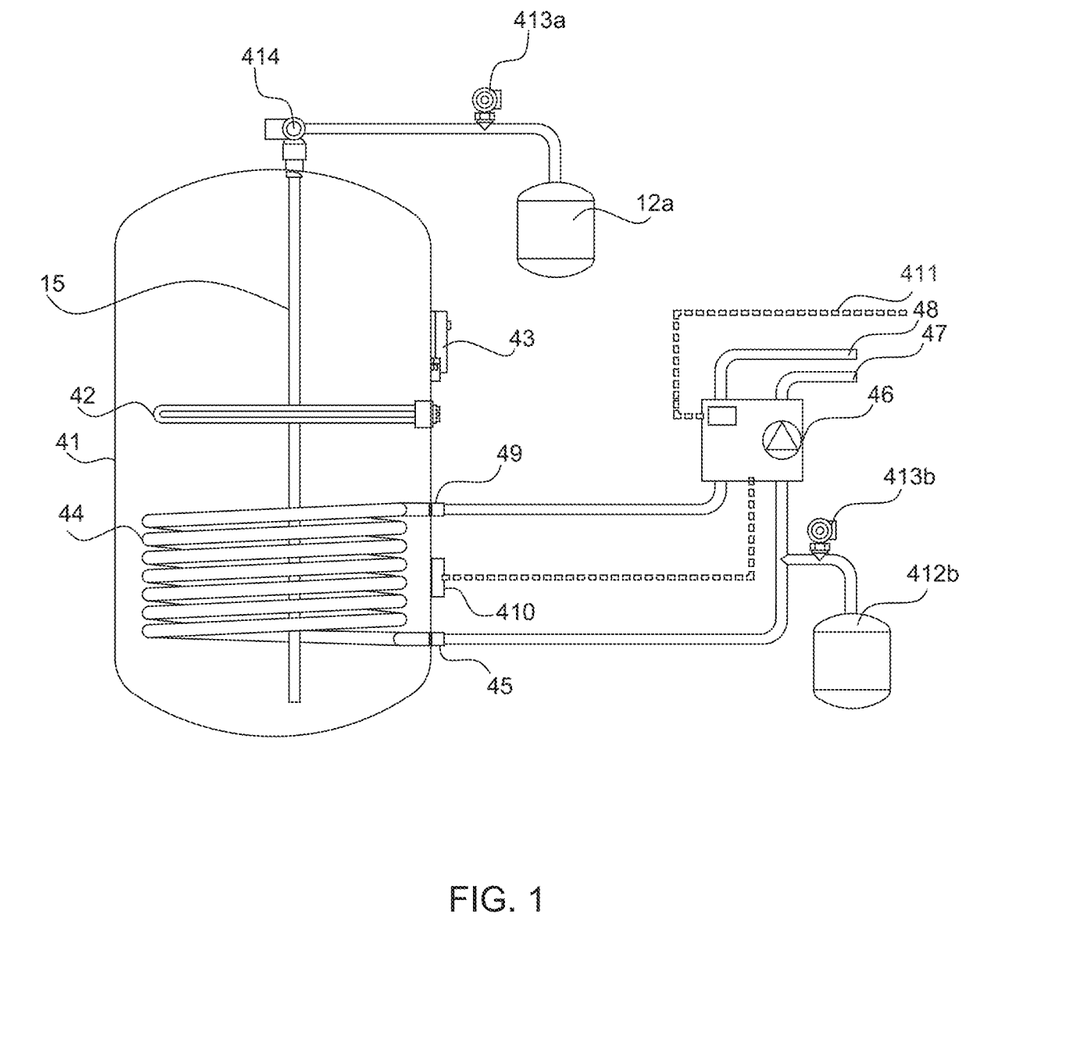
FIG. 1 depicts a water heater with heating from an external heat source by use of a heat exchanger, according to prior art.

FIG. 1 shows a prior art water heater with an internal heat exchanger 4 for heating from an external heat source. Internal of a tank 1 is a built-in coil with separate pressure-less water, often glycol, and it must therefore have a circulation pump 6. This pump 6 will have a high energy consumption for lifting the water and provide circulation up to e.g. a roof for solar panels. Further, a separate relief valve 13 and expansion vessel 12 must be used.

SUMMARY OF INVENTION

The purpose of the present invention is to provide a water heater with only one or two connectors in top of or underneath the tank, for installation of a valve where all the necessary equipment is built in.

Reference is made to the following prior art solutions:

WO2009/063308 discloses a combined system for production of hot water with solar panels and wall mounted boiler.

U.S. Pat. No. 4,403,602 relates to a control valve unit for solar energy system.

WO2005/078359 relates to a combination valve for a water heater.

GB 2460352, EP 3147574A1, FR 2812717 A1, EP 1637817 A1, EP 2317233 A1, WO 9418509 A1 and NO 303300 B1 show further examples of prior art. However, none of the prior art solutions include all the functions which is sought obtained by the present invention.

By incorporating these functions correctly in relation to each other in the valve and concurrently provide supply and return pipes inside and outside the water tank, a simple and cost-effective solution has been obtained.

Further, consumption water with a pressure of approx. 3 bar, can be used for circulation between the tank and the external heat source. Here, a circulation pump with a low consumption, e.g. 2 Watt, will be sufficient to circulate the water, since it is not necessary to lift water 5-10 meters up, which for example is the case with a solar panel. By using the consumption water under pressure, both the relief valve and expansion vessel of the water heater can be used for heating from a separate heat source.

BRIEF DESCRIPTION OF DRAWINGS

FIG. 5a is an external view of the same valve 21 and additionally the bottom part of the relief valve 23 fitted in the same valve housing 21 and the upper part of the relief valve 23a.

DETAILED DESCRIPTION OF THE INVENTION

FIG. 1 depicts a tank 41 for a water heater with an electric coil 42 for afterheat controlled by a thermostat 43 to keep the water on top at 70° C. to prevent *legionella* in the consumption water.

At the top of the tank 41, a valve 414 is installed with a shut-off valve, check valve and a temperature reduction valve giving at most 64° C. out of the discharge valve. Further, a relief valve 413a and an expansion vessel 412a are installed to ensure a maximum pressure of 10 bars. This is all in accordance with prior art. For heating the water in the tank 41 from an external heat source, for example a solar panel, wood, oil and gas burner or a heat exchanger, the tank 41 is provided with a heat exchanger 44 with a suction pipe 45, a pump 46 and a heat source pipe 47 leading to a heat source (not shown), which gives return liquid back in a heat source return pipe 48 and into a return pipe 49 in the heat exchanger 44 in the tank 41. The pump 46 starts by means of control from a thermostat with sensors 410 and 411, when the water in the tank 41 has too low temperature and stops when the temperature is on the highest level set by the thermostat. The closed water system has its own relief valve 413b and an expansion vessel 412b. In addition, the system for consumption water in the tank 41 has corresponding components. All this is in accordance with the prior art.

The reference numbers used to describe prior art do not correspond with the reference number of the present invention.

Figure 2:
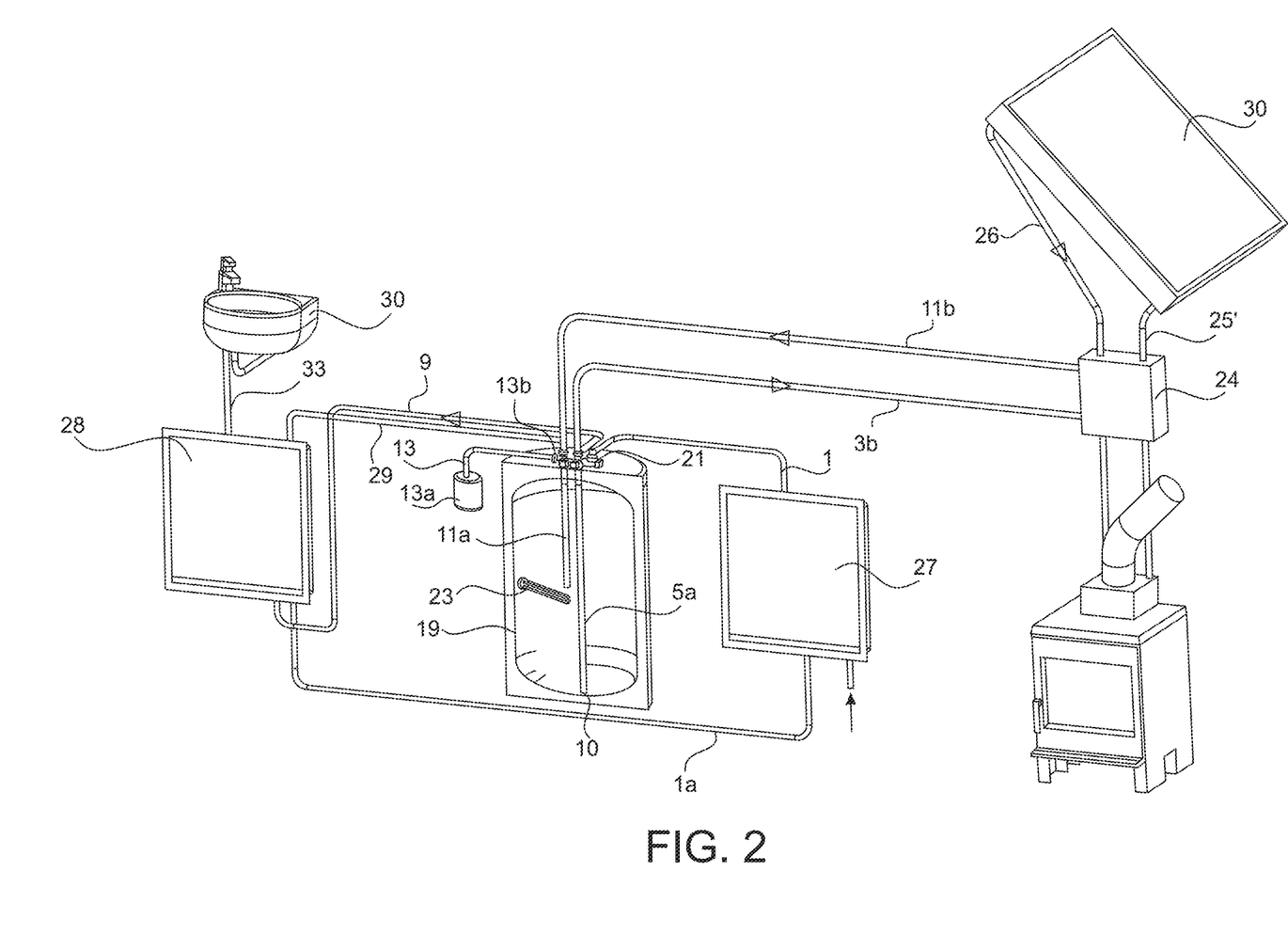
FIG. 2 depicts a water heater with heating from an external heat source and a circulation pipe 9-29 for immediate hot water where the valve is provided on the top of the tank.
Figure 3:
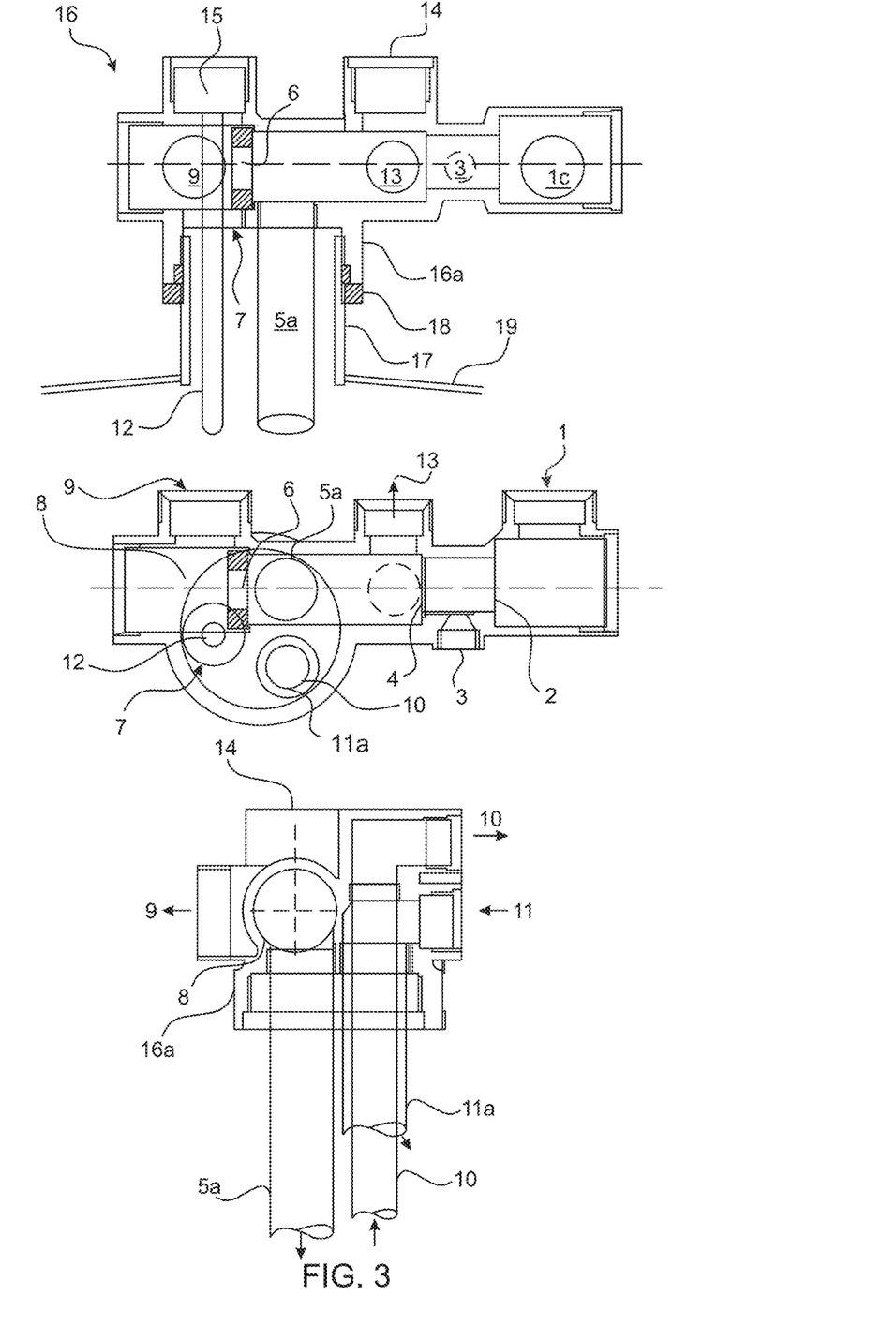
FIG. 3 depicts a cut through valve 16 provided on the top of the tank 19 with one connector 17 for cold water and hot water and connection to a separate heat source by its connectors and pipes 10 and 11.

FIG. 2 depicts, in perspective, an example of a complete system using a valve 21 according to present invention, where a water heater has a valve 21 installed on top of the tank 19. The tank 19 has two connections where an internal cold-water pipe 5a and a suction pipe are provided and are led to the bottom of the tank 19, and an internal return pipe 11a is led halfway down into the tank 19. A cold-water cabinet 27 leads the water from the cold-water supply (indicated by arrow) through a cold-water supply pipe 1 into the valve 21. When tapping in a draining location 30, the cold water is led down in the internal cold water pipe 5a to the bottom of the tank 19 and further, the heated water is forced to the top of the tank 19 and out through the temperature control valve 8 in the valve 21 (FIG. 3). The heated water further flows out through a hot water delivery pipe 9 to a hot water cabinet 28 for distribution, for example to the draining location 30.

If the hot water delivery pipe 9 is long and the house owner wants to obtain the correct temperature quick, a temperature control valve 31 with a circulation pump 32 (see FIG. 6) can be installed in the cabinet 28 with a circulation pipe 29 leading the water back to the valve 21 and down through the internal return pipe 11a.

Water with a temperature of 70° C. will then circulate between the tank 19 and the cabinet 28. By draining, water at 70° C. will be reduced to the required discharge temperature by means of mixing with cold water from a discharge pipe 1a, and the temperature control valve 31 can be set to deliver 55° C. water via the pipe 33. This will result in an approximately immediate delivery of hot water at the draining location 30.

A circulation pump 24, of e.g. 2 Watt, sucks cold water from the bottom of the tank 19 through an internal cold-water pipe 5a, up into the valve 21 and out to an external cold water pipe 5b to the circulation pump 24. The cold water further flows to an external heat source, for example through a solar panel, and from there in return through a heat source return pipe 26 and an external return pipe 11b. The water further flows into the valve 21 and the internal return pipe 11a. This gives complete circulation with consumption water as medium for heating of the tank 19 from an external heat source.

FIG. 3 depicts a complete valve 16 for example of casted brass. The valve 16 is installed in the top of the tank 19 with its socket 17 and because it has only one socket, the valve 16 can be rotated 360 degrees for the required direction for the supply and discharge pipes 1-9, and thereafter being fixedly attached by screwing the backnut 18 to a stop.

The valve 16 has all requisite functions such as a stop cock 2, check valve 4 with control plug 3, screwed on the relief valve at the connection 14. The valve 16 also has a thermostatic mixing valve in a cavity 8. Further the valve 16 is connected to an expansion vessel 13a, through an expansion vessel pipe 13.

In the socket 17, there are three pipes 5a, 10, 11a screwed into the valve 16 and are led into the tank 19. When tapping, cold water is led into the valve 16 in a connection 1c, through the seat of the stop element or stop cock 2, into the seat of the check valve 4 and down to the bottom of the tank 19 by means of the internal cold water pipe 5a. Cold water is forcing the hot water up to the socket 17 on top of the tank 19 and up into the valve's 16 cavity 7 and into the cavity 8 of the temperature reduction valve. In this cavity 8 cold water also enters the seat 6 and is led out of the valve 16 through a hot water delivery pipe 9.

Further functions of the valve 16 is a connector 15 for installation of a pressure and temperature relief valve, normally called PT valve, where a temperature sensor 12 is led down in the top of the tank 19 through the cavity 7 and the socket 17. The function of the PT relief valve is that it opens both at a temperature above 90 degrees and pressure over 9 bars. The other relief valve 14 opens above 9 bars. This result in a triple security against failure.

The expansion vessel 13a prevents dripping from the relief valve by pressure increase when the tank 19 is heated without discharge. This reduces the water consumption. The expansion vessel 13a is connected to the valve 16 through the expansion vessel pipe 13.

By heating of tank 19 by means of external heating 30 (FIG. 2), such as solar panels, the consumption water is sucked up from the bottom of the tank 19 by the pipe 10 by means of for instance a 2 Watt circulation pump 24 to solar panel pipes 25'-26, back with heated water in the external return pipe 11b into valve 16 and halfway down in the tank 19 in the internal return pipe 11a. There is thus no extra relief valve and expansion vessel required, only one water system.

Figure 3A:
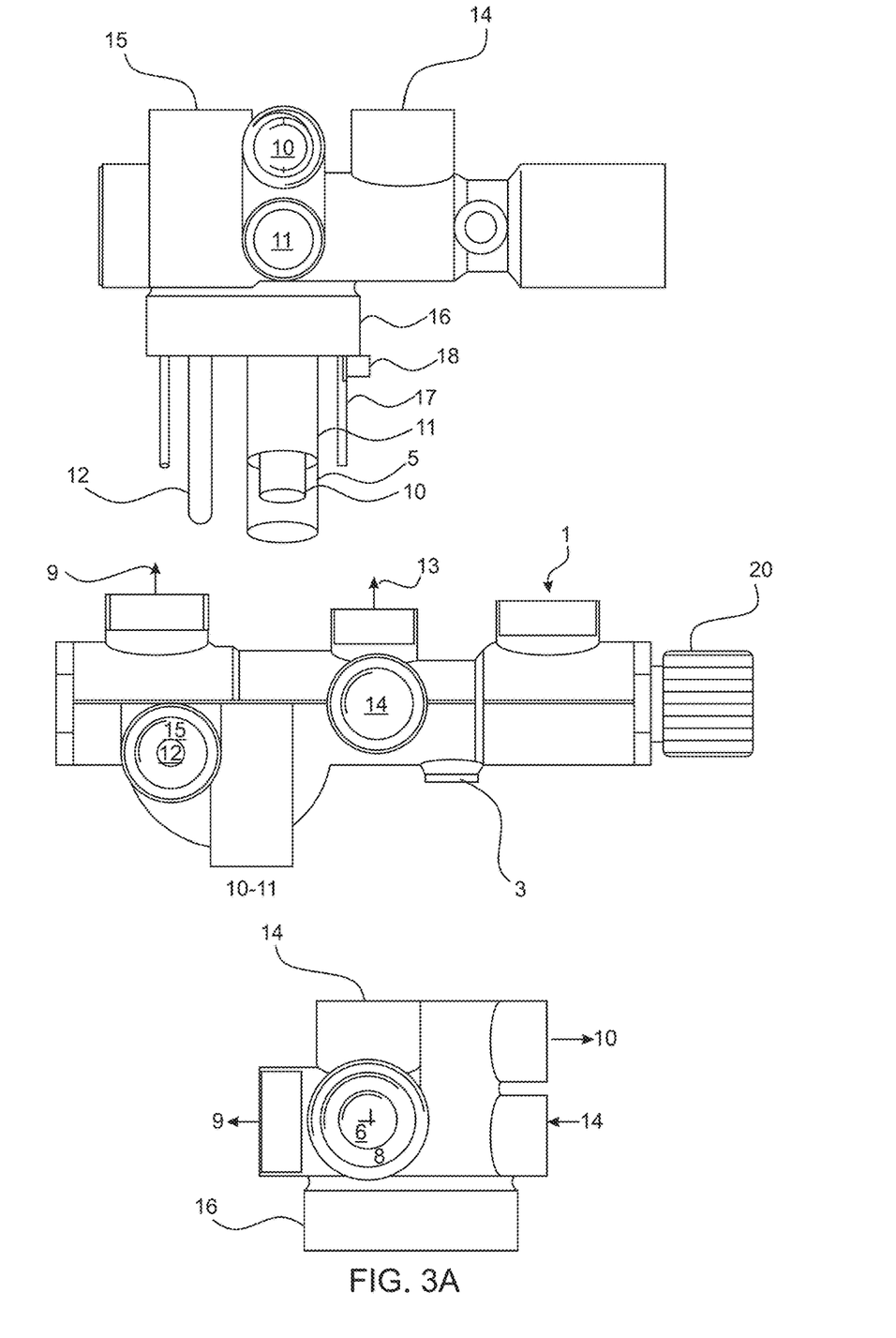
FIG. 3a is an external view of the same valve 16.

FIG. 3a depicts the valve 16 seen from the outside with a stop cock wheel 20 and control for a tight check valve plug 3.

Figure 4:
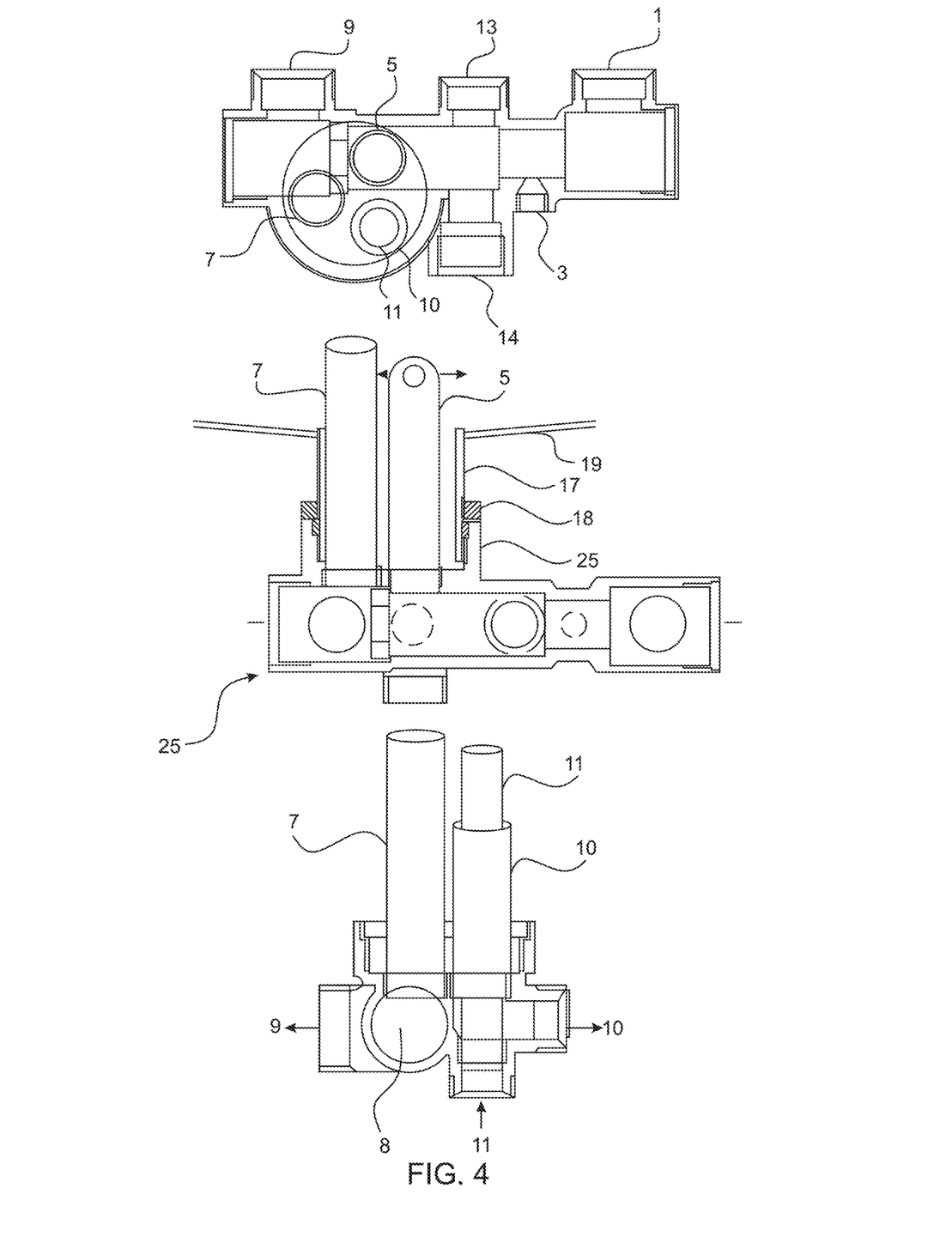
FIG. 4 depicts a cut-through valve 25' installed in the bottom of the tank 19 with one connector 17 for cold and hot water and connection to an external heat source by its connectors and pipes 10-11.

FIG. 4 depicts a valve 25 where all the functions are identical to valve 16 but where the valve 25 is installed in the bottom of the tank 19. The PT valve 15 is not installed in the cold zone. The cold-water pipe 5 is led out of the bottom of the tank 19 and sealed in the end with four outlets to dissipate water at the bottom. A hot water pipe 7 is led to the top of the tank 19. Cold water is sucked from the bottom of the tank 19 in pipe 11 out to an external heating by means of circulation pump 24 and back with heated water in pipe 10 which is led up to the middle of the tank 19.

Figure 4A:
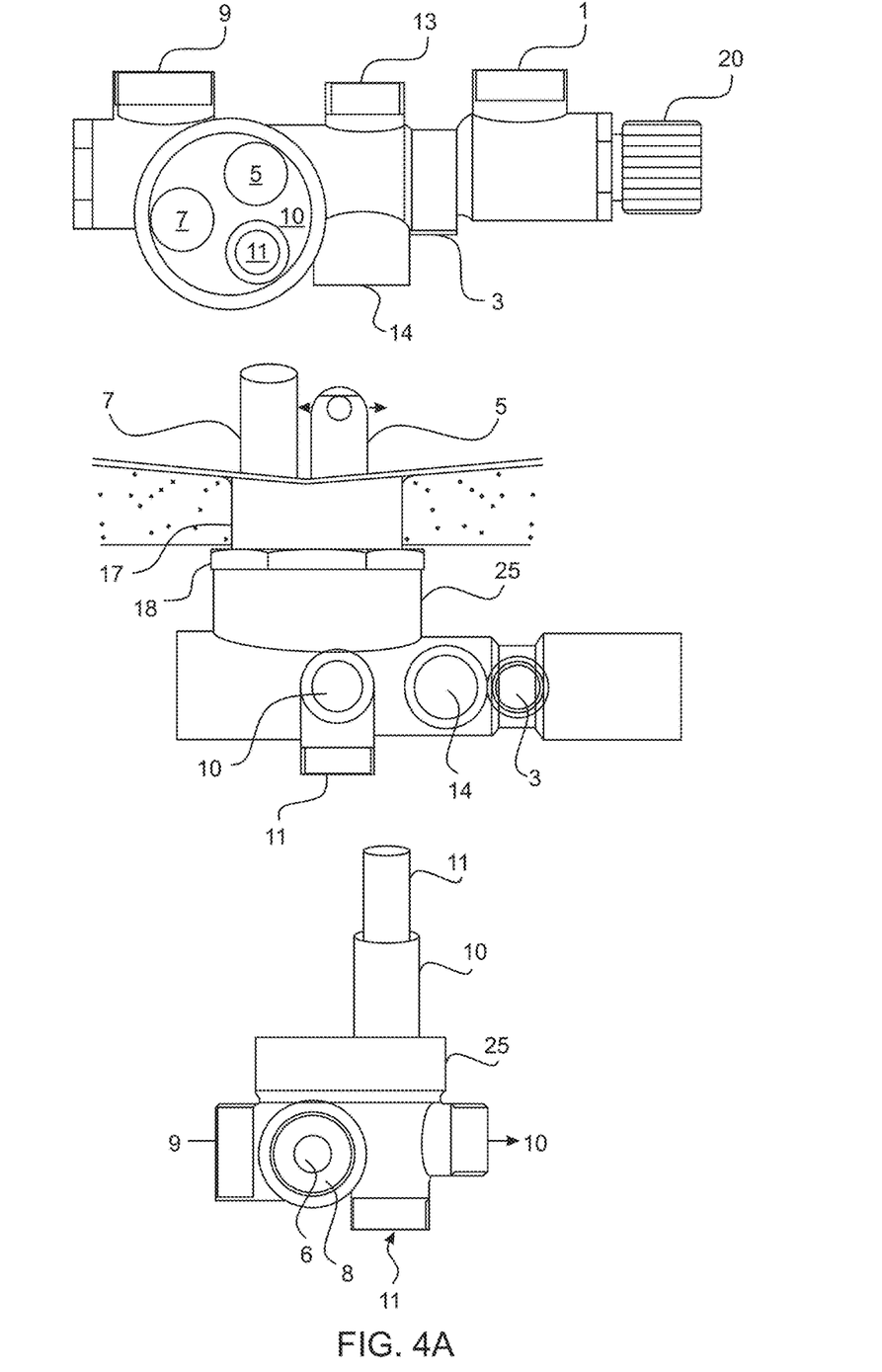
FIG. 4a is an external view of the same valve 25'.

In FIG. 4a, the valve 25 has moved the connection 14 for the relief valve to the front of overflow down. The valve 25 has the same one socket 17 and backnut 18 for optional installation and clamping, as for the valve 21 described in FIG. 3.

Figure 5:
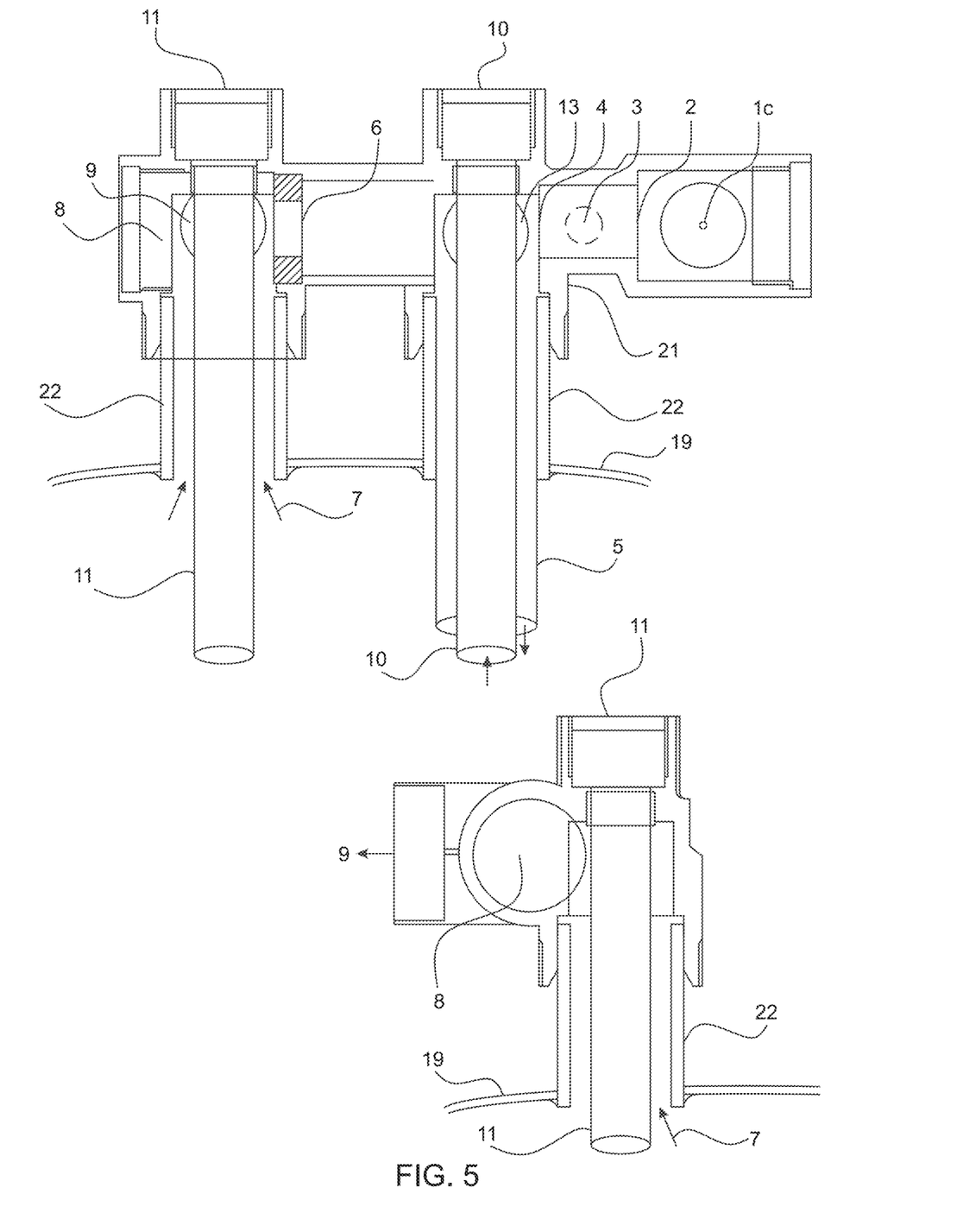
FIG. 5 depicts a cut-through valve 21 installed on top of the tank 19 with two connectors 22 for cold and hot water and connection to an external heat source by its connectors and tubes 10-11.

FIG. 5 depicts valve 21 with the same through-going passages 1-8 as the valves 16 and 25. The difference is that the tank 19 has two sockets 22 welded to the top of the tank 19. By discharge, cold water is led into the connection 1c through the seat of the stop cock 2 and the seat of the check valve 4 and down into the cold-water pipe 5 to the bottom of the tank 19. A pipe 5 is installed extending through the socket 22. The hot water on top leaves the tank 19 through socket 22 in aperture 7, which is led into the cavity 8, for mixing with cold water from the aperture 6, and is led out in the aperture 9. Both valves' connections, which are mounted with the sockets 22, are on the valve 21 led out from center of the cavities 7 and 8. This gives a free passage for the pipes 10-11 down into the tank 19 without restricting moving parts in the cavities 7 and 8.

If there is a desire to heat the tank 19 from an external heat source, a circulation pump (not shown) is used to suck the tank's 19 consumption water from the bottom of the tank 19 in the pipe 10 out through the valve's 21 connections 10 and in pipe 11 back to the middle of the tank 19.

Figure 5A:
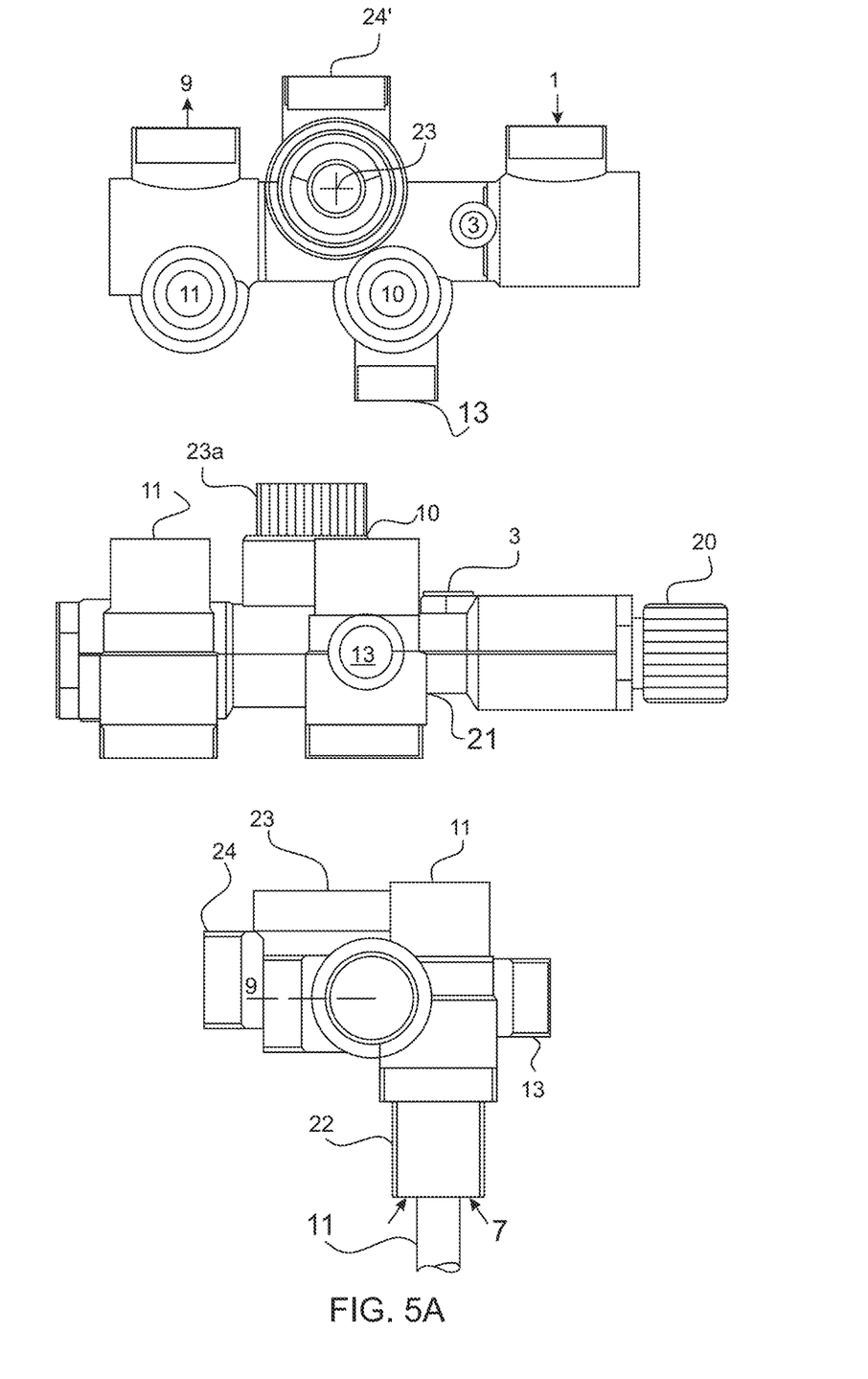

FIG. 5a is an outside view of the valve 21. The valve housing exhibits integrated safety valve 23 with overflow 24'. The valve 21 has otherwise the same the same functions as valve 16, but no possibilities for installation of PT valve. A separate ½" socket must be used for connection to the tank 19.

Valves 16, 25 and 21 can by means of a T-pipe with two check valves installed in the valve housing, use a circulation line between tank 19, the valves and the hot water cabinet 28.

Figure 6:
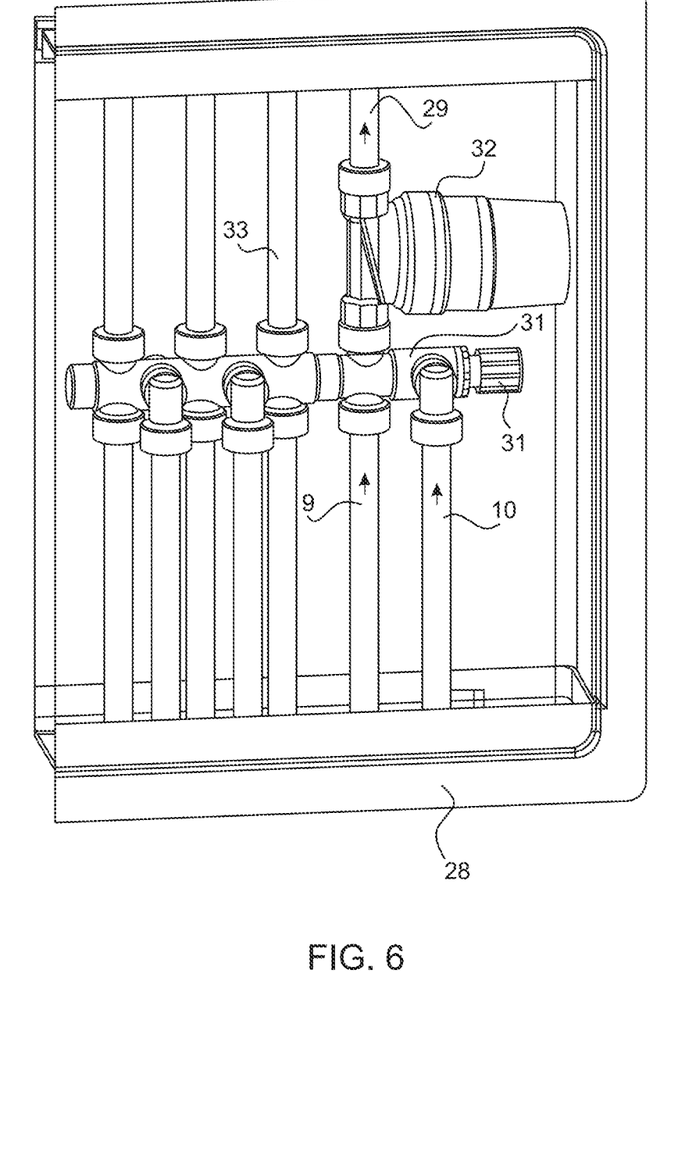
FIG. 6 depicts a hot water cabinet 28 with distribution pipes and a temperature control valve 31 with circulation pump 32 for circulation.

FIG. 6 depicts a cabinet 28 with installed distribution line for pipes to, for instance each draining location 30. A temperature control valve 31 with wheel for adjusting the desired temperature in the water pipe 33, is installed at the end of the line.

At the bottom of the cabinet 28, water at 70 degrees comes in via a pipe 9. This water goes through the valve 31 and up to an installed circulation pump 32 which circulates the hot water back in a pipe 29 to the tank 19 through the pipe 11. Consequently, it is always maintained 70 degree water in the water pipe 33 irrespective of the length and time from the last discharge. By tapping from for example the draining location 30, the hot water flows through the pipe 9 and cold-water through the discharge pipe 1a into the valve 31. The valve 31 mixes the water immediately to the set temperature and the mixed water is led out through one of the pipes from the line, for example a drain delivery pipe 33 to the drain location 30. Only cold water in the drain delivery pipe 33 between the cabinet 28 and the draining location 30 which is left in the pipe between the cabinet 28 and the draining location 30 for about 1 minute without discharge, must leave at the draining location 30 before the correct temperature of the water arrives from the valve 31 in the cabinet 28. Consequently, there is no risk of scalding and both energy and water are saved.

Figure 7:
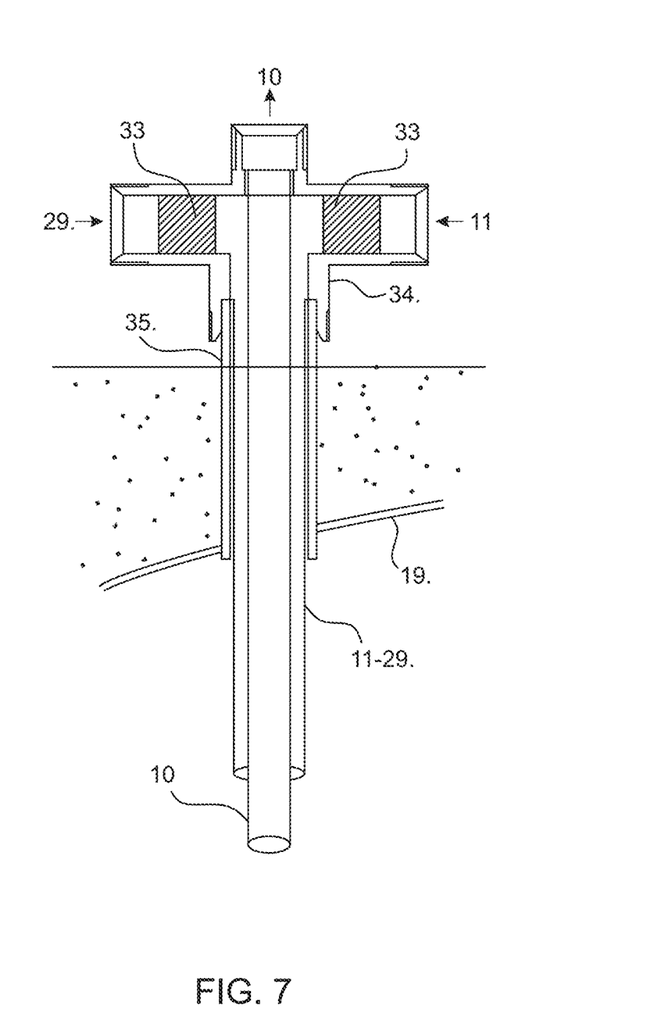
FIG. 7 depicts an embodiment of the water heater having a cross and check valves adapted to be in connection with pipes for circulation of water.

FIG. 7 discloses a further embodiment of the invention. On a water heater without the valve 16-25-21, a socket 35 can be welded on the tank 19. By installing a cross 34 with built-in check valve 33 in the pipes 29 and 11, a circulation pump 32 can circulate water between the tank 19 via the valve connection in pipe 9 to the hot water cabinet 28 and back in through the pipe 29 to the cross 34, and further down to the middle of the tank 19 through pipes 11-29.

A circulation pump 24 (similar as disclosed in FIG. 2) can suck from the bottom of the tank 19 via a pipe 10, through the cross 34 to a socket of the pipe 10 to an external heat source and return of heated water through cross 34 socket of the pipe 11 to pipes 11-29 which lead the heated water from the middle of the tank 19. By means of the check valves 33, both circulation water and heated water are led from external heat source to the middle of the tank 19. This is a good solution by means of a cross fitting with two check valves and a socket 35 which leads pipe 10 to the bottom of the tank 19 and further pipes 11-29 that are led halfway down in the tank 19.

The invention claimed is:

1. A water heater arrangement comprising a valve assembly, a tank, a cold-water supply pipe, an internal cold-water pipe and a hot-water delivery pipe; the valve assembly having a first connection for the cold-water supply pipe, a second connection for the internal cold-water pipe and a third connection for the hot-water delivery pipe and a check valve; the cold-water supply pipe, the check valve and the internal cold-water pipe being parts of a flow path leading pressurized cold-water to a bottom of the tank;

the valve assembly further comprising a cavity, the cavity and the hot-water delivery pipe being coupled to an eight connection forming of a flow path leading hot-water from a top of the tank;

wherein the water heater arrangement further comprises a suction pipe, a circulation pump, an external cold waterpipe, an external return pipe, and an internal return pipe and an external heat source, wherein the valve assembly has a fourth connection for the suction pipe, a seventh connection for the internal return pipe, a fifth connection for the external cold water pipe, and a sixth connection for the external return pipe; the suction pipe, external cold water pipe, circulation pump and the internal return pipe forming a flow path for cold-water from the bottom of the tank, through heating by the external heat source to a middle of the tank; and the arrangement further comprising a hot-water cabinet coupled to the hot-water delivery pipe and a hot-water circulation pipe coupled between the hot-water cabinet and the valve assembly; the hot-water delivery pipe, the hot-water cabinet, the hot-water circulation pipe and the internal return pipe forming a path for circulation of hot-water between the tank and the hot water cabinet and back to the middle of the tank.

2. The water heater arrangement of claim 1, wherein the water heater arrangement comprises a single socket that is welded to a top of the tank, the valve assembly being coupled to the socket, both the cold-water pipe and the internal return pipe extending through the socket.

3. The water heater arrangement of claim 1, wherein the water heater arrangement comprises a single socket that is welded to a bottom of the tank, the valve assembly being coupled to the socket, both the cold-water pipe, the suction pipe and the internal return pipe extending through the socket.

4. The water heater arrangement of claim 1, wherein the water heater arrangement comprises two sockets that are welded to a top of the tank, two of said connections of said valve assembly are coupled to said sockets, and the connections being arranged offset from a center axis of the valve assembly for free passage of the suction pipe through the valve assembly.

5. The water heater arrangement of claim 4, wherein the valve assembly comprises a housing and has an integrated relief valve in the housing.

6. The water heater arrangement according to claim 1, wherein the valve assembly comprises a housing, the housing having cavities; the connections for the suction pipe and the internal return pipe are arranged outside of the cavities in the housing, to facilitate conducting said suction pipe and said internal return pipe through the second connection and the seventh connection without obstructing any movable parts in the cavities.

7. The water heater arrangement of claim 1, wherein the hot-water cabinet comprises a thermostatic mixing valve and a circulation pump, the circulation pump being coupled to circulate hot-water of about 70 degrees Celsius from the valve assembly through the hot-water delivery pipe to the thermostatic mixing valve, and further through the hot-water circulation pipe to a T-pipe with two check valves, the T-pipe being coupled to receive return water from the hot-water circulation pipe and from the external return pipe, and conduct the water through the internal return pipe to the middle of the tank; and that the thermostatic mixing valve is coupled to receive cold-water from a discharge pipe and to mix the hot-water and the cold-water, the thermostatic mixing valve further being coupled to a tap location for delivery of mixed cold and hot water.

\* \* \* \* \*